US008369791B2

(12) United States Patent
Hafeez

(10) Patent No.: US 8,369,791 B2
(45) Date of Patent: Feb. 5, 2013

(54) MULTI-USER BEAMFORMING WITH INTER-CELL INTERFERENCE SUPPRESSION

(75) Inventor: Abdulrauf Hafeez, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 653 days.

(21) Appl. No.: 12/564,269

(22) Filed: Sep. 22, 2009

(65) Prior Publication Data
US 2011/0070918 A1 Mar. 24, 2011

(51) Int. Cl.
H04B 17/00 (2006.01)

(52) U.S. Cl. ............... 455/67.11; 455/522; 455/422.1; 455/424; 455/452.1; 455/501; 455/550.1; 455/450; 455/434; 455/562.1; 455/423; 455/509; 455/68; 455/91; 455/352; 370/329; 370/328; 370/312; 370/252; 370/465

(58) Field of Classification Search ............... 455/67.11, 455/522, 422.1, 424, 452.1, 501, 550.1, 450, 455/434, 562.1, 423, 509, 68, 91, 352; 370/329, 370/328, 312, 252, 465
See application file for complete search history.

(56) References Cited

U.S. PATENT DOCUMENTS

| | | | |
|---|---|---|---|
| 8,169,931 B2 * | 5/2012 | Hui et al. | 370/252 |
| 2009/0296635 A1 * | 12/2009 | Hui et al. | 370/328 |
| 2010/0056140 A1 * | 3/2010 | Hafeez | 455/434 |
| 2010/0075686 A1 * | 3/2010 | Bhattad et al. | 455/450 |
| 2010/0195600 A1 * | 8/2010 | Gorokhov et al. | 370/329 |
| 2010/0261469 A1 * | 10/2010 | Ribeiro et al. | 455/423 |
| 2011/0237272 A1 * | 9/2011 | Gorokhov et al. | 455/452.1 |

OTHER PUBLICATIONS

3GPP TR 25.814 "Physical layer aspects for evolved Universal Terrestrial Radio Access (UTRA)", V7.1.0, Sep. 2006.
IST-4-027756 Winner II Deliverable D4.7.3, "Smart antenna based interference mitigation." Jun. 2007.
M. Schubert and H. Roche, "Solution of the multiuser beamforming problem with individual SINR constraints," *IEEE Trans. VT*, vol. 53, No. 1, Jan. 2004.
G. J. Foschini, K. Karakayali and R. A. Valenzuela, "Coordinating multiple antenna cellular networks to achieve enormous spectral efficiency," *IEE Proc.-Commun.*, vol. 153, issue 4, pp. 548-555. Aug. 2006.
Janghoon Yang and Dong Ku Kim "Multi-cell Uplink-Downlink Beamforming Throughput Duality based on Lagrangian Duality with Per-Base Station Power Constraints" IEEE Communications Letters, vol. 12, No. 4, Apr. 2008 p. 277-279.

* cited by examiner

*Primary Examiner* — Edward Urban
*Assistant Examiner* — Ganiyu A Hanidu

(57) ABSTRACT

Techniques for determining interference-suppressing downlink transmission parameters in a wireless network using coordinated multi-point (CoMP) transmission are disclosed. In each of several iterations of an exemplary method, a tentative user-specific antenna beam-forming vector for the antennas of the first cell is formed for each of several first mobile stations served by the cell and for each of several second mobiles in neighboring cells, based on a most recent tentative virtual allocation of uplink transmitter power to each of the mobile stations and virtual uplink signal-to-noise-plus-interference ratios for the mobile stations that account for inter-cell interference. Further, a current tentative allocation of downlink transmitter power to each of the first mobile stations is determined for each iteration, based on the tentative user-specific antenna beam-forming vectors for the first cell, a pre-determined transmitter power constraint for the first cell, and target signal-to-noise-plus-interference ratios for the first mobile stations.

18 Claims, 5 Drawing Sheets

MULTI-USER BEAMFORMING WITH INTER-CELL INTERFERENCE SUPPRESSION

TECHNICAL FIELD

The present invention relates generally to wireless communications systems, and more particularly to multi-user beamforming between arrays of antennas at one or more wireless access points and multiple user devices.

BACKGROUND

Multi-user multiple-input multiple-output (MIMO) transmission using a grid-of-beams (GoB) approach has been shown to be an attractive scheme for space-division multiple access (SDMA) for emerging wireless systems. See, for example, IST-4-027756 WINNER II Deliverable D4.7.3, "Smart antenna based interference mitigation," June 2007 (hereinafter "WINNER II"). In a GoB scheme, a grid of beams is created by using a closely spaced array of antennas at the base stations. Independent data streams are transmitted to mobile terminals in geographic locations served by non-overlapping beams. A hallmark of this scheme is that it requires very little channel state information at the transmitter (CSIT), as the system need only select an appropriate one of the grid of overlapping beams to serve a particular mobile terminal.

While the GoB-SDMA approach relies on fixed beams, the steering of antenna beams by means of baseband signal processing is also well known. This approach can provide improved coverage and less interference, at the expense of more complex processing and more complicated channel state feedback mechanisms. The general problem of joint adaptive beamforming from a multi-antenna base station to multiple single-antenna mobile terminals has been solved. See, for example, M. Schubert and H. Boche, "Solution of the multi-user beamforming problem with individual SINR constraints," *IEEE Trans. Vehicular Technology*, vol. 53, no. 1, January 2004 (hereinafter "Shubert"). With Shubert's solution, the beamformers and transmission powers are jointly adjusted to fulfill individual signal-to-interference-plus-noise ratio (SINR) requirements at the mobile terminals. Shubert presents an algorithm that maximizes the jointly-achievable SINR margin (over the SINR requirements) under a sum transmit power constraint, i.e., a constraint that limits the total power transmitted from all the antennas of the base station antenna array. Shubert also provides an alternative algorithm that minimizes the sum transmit power while satisfying the set of SINR requirements for the mobile terminals. Each of these algorithms requires the base station to have statistical information characterizing the channel conditions.

A coordinated multi-point (CoMP) transmission system architecture is being considered for IMT-Advanced systems. (The term "distributed antenna system," or DAS, has also been applied to these concepts under development for IMT-Advanced systems; the term CoMP, as used herein, is not intended to exclude systems or techniques that use the DAS nomenclature.) CoMP differs from a conventional cellular system in that antennas are deployed at several access points dispersed across a CoMP cell. The access points are connected to a central processing unit (CPU) by means of a fast backhaul. Compared to a conventional cellular network, very high spectral efficiencies are possible in a CoMP network. In the downlink, this is because transmissions from multiple access points can be coherently coordinated. In the uplink, mobile terminal transmissions can be received at multiple access points, and the received signals processed jointly for improved reception. Of course, this coordination requires that statistical information characterizing the channel conditions between a given mobile and each of the access points is available.

The fixed and adaptive multi-user beamforming schemes applied to conventional cellular systems are not appropriate for a CoMP network, as these schemes cannot exploit the coordination between access points in a CoMP cell. Furthermore, applying beamforming schemes in a CoMP network can create intra-cell and inter-cell interference that are not easily moderated using conventional interference cancelling schemes.

SUMMARY

Disclosed herein are various methods and apparatus for determining downlink transmission parameters in a cell of a cellular wireless network using coordinated multi-point (CoMP) transmission. The techniques disclosed facilitate the formation of multi-user multi-antenna beams that suppress inter-cell interference. In some embodiments of the invention, mobile terminals in a given cell as well as mobile terminals in neighboring cells have individual signal-to-intra-and-inter-cell-interference-plus-noise ratio (SIINR) targets. Downlink power allocations and antenna beamforming vectors are determined to maximize the jointly-achievable SIINR margin for all mobile terminals under either a sum-power constraint or per-transmitter power constraint, where the jointly-achievable SIINR margin is the ratio of the achieved SIINR to the SIINR target for the worst-case mobile terminal. In some embodiments, downlink power allocations and beamforming vectors are determined to achieve the SIINR targets for all mobile terminals while minimizing the total transmitted power.

In other embodiments, mobile terminals in a given cell have individual signal to intra-cell-interference-plus-noise ratio (SINR) targets. In these embodiments, a downlink power allocation is determined to maximize the jointly-achievable SINR margin for the mobile terminals under sum or per-transmitter power constraints; and beamforming vectors are determined to maximize the SIINR for each mobile terminal in a dual uplink multiple access channel (MAC). In other embodiments, downlink power allocations and beamforming vectors are determined to achieve the SINR targets for all mobile terminals while minimizing the sum transmitted power.

In an exemplary method, downlink transmission parameters are determined for a first cell of a cellular wireless network using coordinated multi-point transmission, wherein the first cell comprises a plurality of radio access points and wherein each radio access point comprises one or more transmit antennas. This exemplary method comprises, for each of two or more iterations, determining, for each of a plurality of first mobile stations served by the first cell and for each of one or more second mobile stations served by one or more neighboring cells, a tentative user-specific antenna beam-forming vector for the antennas of the first cell, using a most recent tentative virtual allocation of uplink transmitter power to each of the first and second mobile stations and based on virtual uplink signal-to-noise-plus-interference ratios for the first and second mobile stations that account for inter-cell interference. The method further comprises, for each iteration, determining a current tentative allocation of downlink transmitter power to each of the first mobile stations, based on the tentative user-specific antenna beam-forming vectors, a predetermined transmitter power constraint for the first cell, and target signal-to-noise-plus-interference ratios for the first mobile stations, and then determining a current tentative virtual allocation of uplink transmitter power to each of the first and second mobile stations, based on the current tentative allocation of downlink transmitter power. In some embodiments, the determination of the virtual allocation of uplink transmitter power may take into account inter-cell interference, while inter-cell interference may be ignored in this step in other embodiments. These steps may be repeated until the process converges, e.g., until improvements in signal-to-noise-plus-interference stop improving significantly.

In some embodiments, the pre-determined power constraint is a sum power constraint, i.e., a constraint that defines a maximum downlink transmitter power aggregated over the radio access points of the first cell. In others, the pre-determined transmitter power constraint defines a maximum access point transmitter power for each of the plurality of radio access points, i.e., a per-transmitter power constraint. In some of these embodiments, a downlink power allocation may be computed in each iteration, based on the current tentative beamforming vectors and the signal-to-noise-plus interference ratio targets. Each downlink power allocation may be converted to a virtual uplink power allocation for use in determining improved beamforming vectors in the next iteration of the process. Once the process converges, the most recently computed beamforming vectors and the most recently computed downlink power allocation may be used to transmit data to the mobile stations in the CoMP cell.

In several embodiments, determining the current tentative allocation of downlink transmitter power to each of the first mobile stations comprises finding downlink transmitter powers corresponding to each of the first and second mobile stations by applying a maximization objective to the smallest margin between a downlink signal-to-noise-plus-interference ratio that accounts for inter-cell interference and a corresponding target signal-to-noise-plus-interference ratio for each of the first and second mobile stations, given the tentative user-specific antenna beam-forming vectors. In other words, the worst-case margin of signal-to-noise-plus-interference ratio over its corresponding target is maximized, where the signal-to-noise-plus-interference ratios account for inter-cell interference.

In other embodiments, determining the current tentative allocation of downlink transmitter power to each of the first mobile stations comprises finding downlink transmitter powers corresponding to each of the first mobile stations by applying a maximization objective to the smallest margin between a downlink signal-to-noise-plus-interference ratio and a corresponding target signal-to-noise-plus-interference ratio, for each of the first mobile stations, without regard to interference from the second mobile stations. In other words, the worst-case margin of signal-to-noise-plus-interference ratio over its corresponding target is maximized, where the signal-to-noise-plus-interference ratios ignore inter-cell interference.

Apparatus configured to carry out the various techniques described herein are also disclosed, including a controller for a cell of a wireless network using coordinated multi-point transmission.

The present invention may, of course, be carried out in other ways than those specifically set forth herein without departing from essential characteristics of the invention. Upon reading the following description and viewing the attached drawings, the skilled practitioner will recognize that the described embodiments are illustrative and not restrictive, and that all changes coming within the meaning and equivalency range of the appended claims are intended to be embraced therein

DETAILED DESCRIPTION

Figure 1:
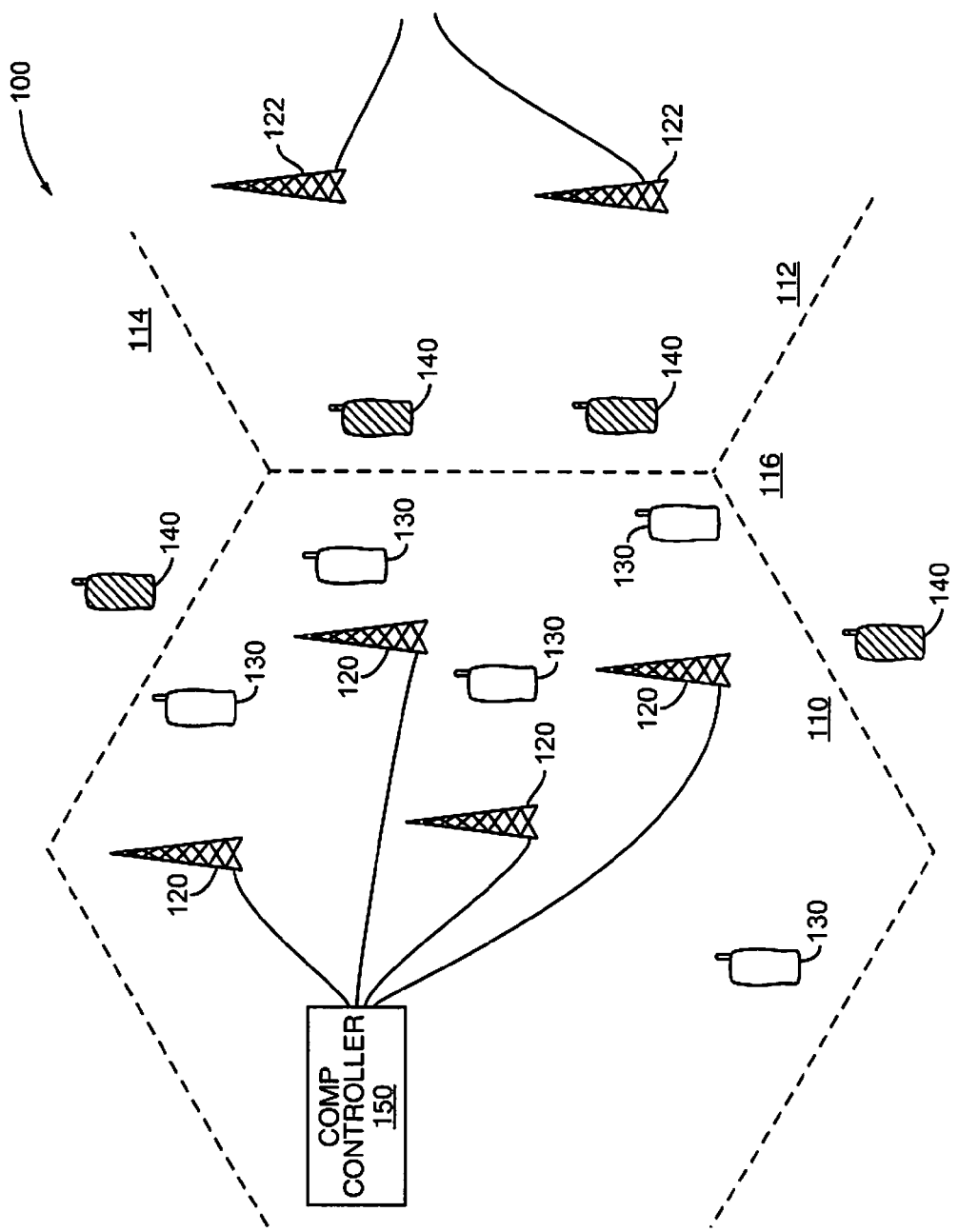
FIG. 1 illustrates a cellular system utilizing coordinated multi-point transmission.

As noted above, the fixed and adaptive multi-user beamforming schemes applied to conventional cellular systems are not appropriate for a CoMP network, as these schemes cannot exploit the coordination between access points in a CoMP cell. The present inventor has filed a related, co-pending U.S. patent application Ser. No. 12/406,489, filed Mar. 18, 2009 (hereinafter "Hafeez"), the entire contents of which are incorporated by reference herein. In Hafeez, techniques for joint adaptive beamforming from multiple access points with array antennas to several mobile terminals in a CoMP cell are provided. These techniques effectively exploit the coordination between the multiple access points, and are suitable for a frequency division duplex (FDD) air interface where there is no channel reciprocity between uplink and downlink to allow coherent channel state information t the transmitter. These techniques are also suitable for wide area cellular deployments where the channel typically exhibits low angular spreads.

The fixed and adaptive multi-user beamforming schemes described in WINNER II and Shubert, respectively, each address the problem of intra-cell interference. The multi-transmitter, multi-user, beamforming scheme described in Hafeez likewise addresses the intra-CoMP cell interference problem. However, all of these schemes suffer from problems with inter-cell interference, i.e. the interference between conventional or CoMP cells.

The harmful effects of inter-cell interference in a cellular system are more pronounced when beamforming is employed, as the beamforming causes the so-called flashlight effect. Of course, a CoMP cell might have larger geographic footprints than conventional cells, and therefore may not suffer much from inter-cell interference. However, synchronization requirements, backhaul capacity issues, etc., impose practical limits on the geographical footprint of a CoMP cell. Moreover, mobile terminals located close to a border between CoMP cells are still likely to suffer from inter-cell interference, no matter how large the CoMP cell.

Indeed, system simulations have indicated that inter-cell interference can severely limit the performance of multi-user beamforming in a CoMP cell. In fact, for CoMP cells comprising up to 21 sectors and four antenna elements per sector, multi-transmitter multi-user beamforming performs only slightly better than GoB-SDMA, where the latter does not account for intra-CoMP cell interference. Thus, inter-cell interference still represents an obstacle to achieving high spectral efficiencies in future wireless networks.

One known solution to the flashlight problem is coordinated beam switching. With this approach, a predefined beam cycling pattern is used by cells in a neighborhood that use a fixed multi-user MIMO scheme, such as GoB-SDMA. However, a fixed beam cycling pattern limits the available spectral resources, and requires that mobile terminals in all cells perform beamforming. Thus, other solutions are needed.

Accordingly, various embodiments of the present invention are related to multi-user beamforming techniques that suppress inter-cell interference in a cellular network. In some embodiments, as described in more detail below, mobile terminals in a given CoMP cell and its neighboring cells each have individual signal-to-intra-and-inter-cell-interference-plus-noise ratio (SIINR) targets. (Those skilled in the art will note that SIINR, as used herein, refers to a received signal quality metric that accounts for inter-cell interference, i.e., interference associated with transmissions from neighboring CoMP cells. In contrast, the term signal-to-intra-cell-interference-plus-noise ratio, or SINR, is used herein to refer to a corresponding signal quality metric that does not account for inter-cell interference.) In these embodiments, downlink power allocations and beamforming vectors are determined to maximize the jointly-achievable SIINR margin for all mobile terminals, where the jointly-achievable SIINR margin is the ratio of the achieved SIINR to the SIINR target for the worst-case mobile terminal. In various ones of these embodiments, the power allocations and beamforming vectors are determined under sum transmitter power constraints or per-transmitter power constraints. In another embodiment of the invention, downlink power allocation and beamforming vectors are determined so as to minimize the sum transmitted power while still achieving the SIINR targets for all mobile terminals.

In still other embodiments of the invention, mobile terminals in a given cell have individual downlink signal-to-intra-cell-interference-plus-noise ratio (SINR) targets. Downlink power allocations are determined to maximize the jointly-achievable SINR (not SIINR) margin for the mobile terminals under either a sum transmitter power constraint or a per-transmitter power constraint, and beamforming vectors are determined to maximize the uplink SIINR for each mobile terminal in a virtual dual uplink multiple access channel (MAC) In yet other embodiments, downlink power allocations and beamforming vectors are determined to achieve the SINR targets for all mobile terminals while minimizing the sum transmitted power.

Downlink System Model

To describe the multi-user beamforming techniques of the present invention, a cell with N coordinating access points and K mobile terminals is considered. A simplified view of such a cell is given in FIG. 1, which depicts a portion of a first CoMP cell 110 along with portions of neighboring cells 112, 114, and 116. CoMP cell 110 includes a CoMP controller 150, which provides centralized coordination of several access points 120. Several mobile terminals 130 are within CoMP cell 110; additional mobile terminals 140 are operating in neighboring cells 112, 114, and 116, including several mobile terminals 140 served by access points 122 in cell 112.

Referring once more to an exemplary cell having N access points and K mobile terminals, transmission from the access points, each of which has $M_t$ transmit antennas, is coordinated by means of a central processing unit or other means (e.g., CoMP controller 150 in FIG. 1.) For the purposes of this analysis, it is assumed that each mobile terminal has one receive antenna, although the techniques described herein may be adapted to multi-antenna mobile terminals. Thus, if the $1 \times M_t$ vector $h_{i,n}$ represents the frequency-non-selective fading channel between mobile terminal i and access point n, then the $1 \times NM_t$ vector $$h_i = [h_{i,1} h_{i,2} L h_{i,N}]$$

represents the channel between the i-th mobile terminal and all access points. The downlink baseband signal model is then given by $$y_i = h_i x + w_i, \quad (1)$$

where x is an $NM_t \times 1$ vector representing the signal transmitted from the transmit antennas of all access points and $w_i$ is a sample of additive white Gaussian noise with variance $\sigma_i^2$.

The transmitted signal is given by:

$$x = \sum_{i=1}^{K} x_i = \sum_{i=1}^{K} \sqrt{p_i} \, u_i s_i,$$

where $s_i$ is a modulation symbol (drawn from a unit-variance symbol alphabet) transmitted to the i-th mobile terminal using a beamforming or precoder vector $u_i$, with power $p_i$. The beamforming vectors are normalized to have unit power:

$$E[u_i^H u_i] = 1 \, \forall i = 1, 2, KK.$$

The transmit channel covariance matrix for the i-th mobile terminal is given by $$R_i = E[h_i^H h_i].$$

Assuming that instantaneous channel vector $h_i$ at the i-th mobile terminal is known, then the downlink SINR at the i-th mobile terminal can be calculated according to:

$$SINR_i^{DL}(U, \underline{p}) = \frac{p_i u_i^H R_i u_i}{\sum_{k=1, k \neq i}^{K} p_k u_k^H R_i u_k + \sigma_i^2}, \quad (2)$$

where $U = [u_1, u_2, L \, u_K]$ is the matrix of beamforming vectors for all of the K mobile terminals and $\underline{p} = [p_1, p_2, K, p_K]$ is the vector of downlink transmit powers.

Dual Uplink MAC

Consider a "virtual" uplink multiple access channel (MAC) where each mobile terminal transmits an independent data stream received by all antennas of all access points. Those skilled in the art will appreciate that the modifier "virtual," as used herein, is intended simply to denote that the term modified by the word "virtual" need not physically exist, but may be an abstraction or a modeling element for facilitating the calculation of a physical parameter. Thus a virtual uplink MAC may define an allocation of uplink transmitter powers that does not actually exist, but that is used for facilitating the determination of downlink transmitter power allocations. In any event, the system model for the uplink MAC may be given by:

$$\underline{y}^{UL} = \sum_{i=1}^{K} \underline{h}_i^T x_i^{UL} + \underline{w}^{UL}, \quad (3)$$

where $w^{UL}$ is zero-mean average white Gaussian noise, with identity covariance matrix, and $x_i^{UL}$ is the signal transmitted from mobile terminal i, given by:

$$x_i^{UL} = \sqrt{q_i} s_i / \sigma_i.$$

In the latter expression, $q_i$ is the transmit power of mobile terminal i. Assuming that a linear filter $u_i$ is used to detect the symbol $s_i$ transmitted from mobile terminal i, then the SINR for the uplink is given by:

$$SINR_i^{UL}(U, \underline{q}) = \frac{q_i u_i^H R_i' u_i}{u_i^H \left( \sum_{k=1, k \neq i}^{K} q_k R_k' + I \right) u_i}, \quad (4)$$

where:

$$R_i' = R_i / \sigma_i^2.$$

Note that SINR as defined in Equation (4) refers to a signal-to-intra-cell-interference-plus-noise ratio; i.e., SINR does not account for inter-cell interference.

It has been shown (e.g., by Shubert) that the virtual uplink MAC, as described above, is a dual to the downlink broadcast channel, in the sense that the two channels have the same SINR achievable regions. In other words, whatever SINR targets can be achieved in the downlink by means of a downlink power allocation $p=[p_1, p_2, K, p_K]^T$, with sum $\|p\|_1$, can also be achieved in the dual uplink MAC by means of an uplink power allocation $q=[q_1, q_2, K, q_K]^T$, with sum $\|q\|_1 = \|p\|_1$. The reverse is also true. Moreover, it has been shown that the SINR targets can be achieved in both links using the same beamforming vectors and receive filters. As will be shown in further detail below, this duality may be exploited in an iterative approach for determining downlink transmission parameters, through the use of a virtual dual uplink MAC corresponding to the desired downlink MAC.

Multi-User Beamforming without ICI Suppression

The multi-user beamforming algorithm described by Shubert maximizes the jointly-achievable SINR margin (C) under a sum power constraint (SPC). This can be expressed as:

$$C(P_{max}) = \max_{U, \underline{p}} \min_{1 \leq i \leq K} \frac{SINR_i^{DL}(U, \underline{p})}{\gamma_i} \quad (5)$$
$$= \max_{U, \underline{q}} \min_{1 \leq i \leq K} \frac{SINR_i^{UL}(U, \underline{q})}{\gamma_i},$$

subject to:

$$\sum_{i=1}^{K} p_i \leq P_{max},$$

where $\gamma_i$ is the target SINR for mobile terminal i and $P_{max}$ is the maximum sum transmit power.

Shubert's algorithm iteratively repeats the following steps: (a) given a virtual uplink power allocation, find the beamforming vectors that maximize the dual uplink SINRs (e.g., as given in Equation (4)); and (b) given the beamforming vectors, find the virtual uplink power allocation that maximizes the jointly-achievable SINR margin under the sum power constraint (e.g., as given in Equation (5)). After the algorithm converges, the corresponding downlink power allocation may be obtained by a simple variable conversion.

While Shubert's approach maximizes the jointly-achievable SINR margin under a sum transmit power constraint, the multi-user beamforming algorithm of Hafeez maximizes the jointly-achievable SINR margin (C) under a per-transmitter power constraint (PTPC). Thus:

$$C(P_{max}) = \max_{U, \underline{p}} \min_{1 \leq i \leq K} \frac{SINR_i^{DL}(U, \underline{p})}{\gamma_i}, \quad (6)$$

subject to:

$$\sum_{i \in S_n} p_i \leq P_{max} \ \forall n = 1, 2, KN,$$

where $S_n$ is the set of all mobile terminals connected to access point n. Thus, each of the N access points is separately limited to a maximum output power of $P_{max}$.

Hafeez's algorithm iteratively repeats the following steps: (a) given a virtual uplink power allocation, find the beamforming vectors that maximize the dual uplink SINRs, as in Equation (4); (b) given the beamforming vectors, find the downlink power allocation that maximizes the jointly-achievable SINR margin under the per-transmitter power constraint, as in Equation (6); and (c) given the downlink power allocation, find the uplink power allocation that achieves the same SINRs in the uplink. This process is repeated until it converges.

Multi-User Beamforming with Inter-Cell Interference Suppression

To illustrate the suppression of inter-cell interference in the multi-user beamforming process, a scenario is considered in which there are J mobile terminals located in cells in the neighborhood of a transmitting cell (e.g., such as the mobile terminals 140 in FIG. 1). These neighborhood cells (e.g., cells 112, 114, and 116, in FIG. 1) share transmission information with the given cell, including such information as the transmit covariance matrices corresponding to the channels between the access points in the neighborhood cells and the mobile terminals in all cells. With this information, beamforming weights and transmit powers can be computed jointly for the access points in the given cell and the neighborhood cells. Joint beamforming across multiple cells naturally suppresses inter-cell interference, as all of the transmitting access points are effectively coordinated. Thus, this conceptual approach is an extension of the scheme described in Hafeez, applied to multiple cells. Of course, this approach would require information sharing between multiple cells in the neighborhood of any given serving cell.

However, consider the scenario in which a given cell does not have information about the transmit covariance matrices for the access points in the neighborhood cells. Further, assume that the given cell has information indicating that the neighboring cell's transmissions to its own mobile terminals are scheduled in the same frame as its own mobile terminals, and are thus potentially interfering. Moreover, assume that the given cell knows the transmit covariance matrices corresponding to the channels between its access points and the neighboring cell mobile terminals. In practice, this information can be obtained by using uplink channel pilots transmitted by mobile terminals in the neighboring cells, for example. Given this information, a CoMP cell can reduce inter-cell interference to and from mobile terminals in neighboring cells by avoiding beam transmission in the directions of the neighboring cell mobile terminals.

Some embodiments of the present invention avoid beam transmission in the directions of the neighboring cell mobile terminals by considering neighboring cell mobile terminals as being served by the access points in the given cell, for the purposes of determining beamforming weights and/or transmit powers. Thus, beamforming vectors and transmit power allocations are designed jointly for mobile terminals in a given cell as well as for mobile terminals in one or more neighboring cells. In some of these embodiments, this is done by applying the multi-user beamforming scheme described in Hafeez to mobile terminals in the given cell as well as to several mobile terminals in neighboring cells. Although beams are designed for all of the mobile terminals, only those designed for the mobile terminals served by the given are actually used. The beams for the neighboring cell mobile terminals are developed for the purpose of ensuring that the ultimately determined beams and power allocations minimize, or at least reduce, inter-cell interference to and from the mobile terminals in the neighboring cells. Once the final beams and power allocations are determined, the beamforming vectors corresponding to mobile terminals in neighboring cells can simply be discarded.

An exemplary method of determining downlink transmission parameters according to this general technique can now be described as follows. First, assume that downlink transmission parameters are needed to serve K mobile terminals in a CoMP cell of interest, in consideration of J mobile terminals in neighboring cells. The mobile terminals within the CoMP cell can then be indexed as $1, 2, \ldots, K$, and the neighboring cell mobile terminals indexed as $K+1, K+2, \ldots, K+J$. Then, the system model for downlink transmissions in the given cell to mobile terminal i, where $i \in [1, 2, K, K+J]$, is given by Equation (1), but with the transmitted signal x given by:

$$x = \sum_{i=1}^{K+J} x_i = \sum_{i=1}^{K+J} \sqrt{p_i}\, u_i s_i, \qquad (7)$$

where $U=[u_1, u_2, L\, u_{K+J}]$ are the beamforming vectors and $p=[p_1, p_2, K, p_{K+J}]$ are the downlink transmit powers for mobile terminals $1, 2, \ldots, K+J$, respectively.

The downlink SIINR for mobile terminal i is given by:

$$SIINR_i^{DL}(U, \underline{p}) = \frac{p_i u_i^H R_i u_i}{\sum_{k=1,k\neq i}^{K+J} p_k u_k^H R_i u_k + \sigma_i^2}. \qquad (8)$$

It should be noted that the SIINR for neighboring cell mobile terminals depends in part on the noise variances at those mobile terminals. For the purposes of this analysis, it is assumed that the noise variances can be estimated (at least roughly) in the given cell.

The SIINR for mobile terminal i in the virtual dual uplink MAC is given by:

$$SIINR_i^{UL}(U, \underline{q}) = \frac{q_i u_i^H R_i' u_i}{u_i^H \left( \sum_{k=1,k\neq i}^{K+J} q_k R_k' + I \right) u_i}, \qquad (9)$$

where $q=[q_1, q_2, K, q_{K+J}]$ are the virtual uplink transmit powers for mobile terminals $1, 2, \ldots, K+J$, respectively. The SIINR margin under the sum power constraint (SPC) is defined as:

$$C(P_{max}) = \max_{U,\underline{p}} \min_{1 \leq i \leq K} \frac{SIINR_i^{DL}(U, \underline{p})}{\gamma_i} \qquad (10)$$

$$= \max_{U,\underline{q}} \min_{1 \leq i \leq K} \frac{SIINR_i^{UL}(U, \underline{q})}{\gamma_i},$$

subject to:

$$\sum_{i=1}^{K+J} p_i \leq P_{max},$$

where $\gamma_i$ is the target SIINR for mobile terminal i.

Given the above formulas, a process for determining downlink transmission parameters according to some embodiments of the present invention iteratively repeats the following steps: (a) given a virtual uplink power allocation, find the beamforming vectors that maximize the dual uplink SIINRs, e.g., by using Equation (9); (b) given the beam-forming vectors, find a downlink power allocation to maximize the jointly-achievable SIINR margin under the sum-power constraint, e.g., by using Equation (10); and (c) given the downlink power allocation, find the virtual uplink power allocation that achieves the same SIINRs in the uplink, for use in the next iteration. Once the algorithm converges, the downlink power allocation may be obtained by a simple variable conversion.

Figure 2:
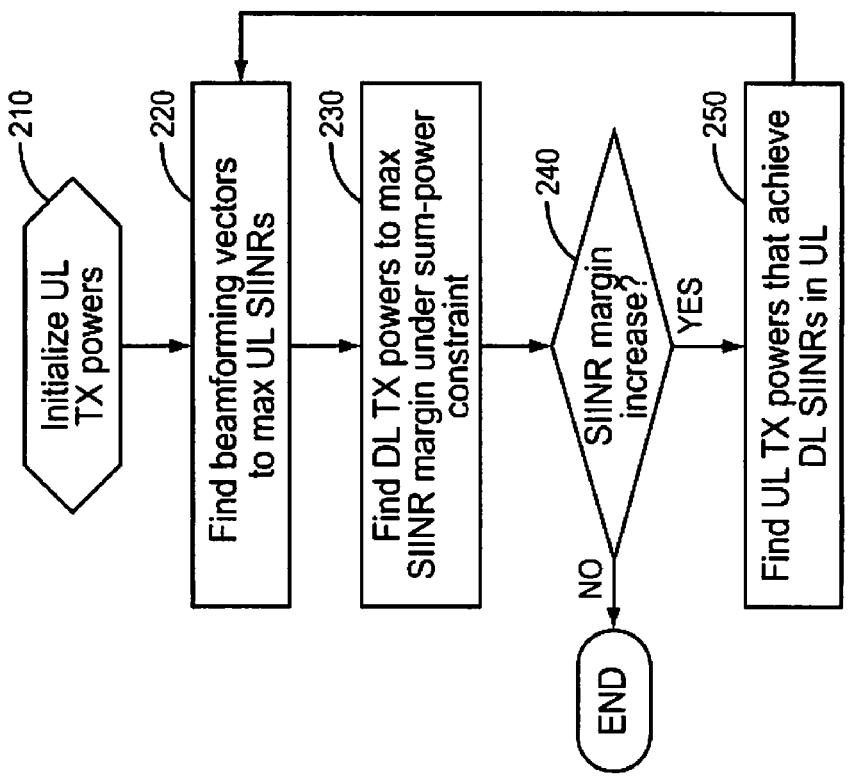
FIG. 2 illustrates an exemplary method for determining downlink transmission parameters based on a sum transmitter power constraint.

This iterative process for determining downlink transmission parameters under a sum-power constraint is illustrated in the process flow diagram of FIG. 2. The process flow of FIG. 2 begins, as shown at block 210, with the initialization of a virtual allocation of uplink transmitter power to each of the K+J mobile terminals. As shown at block 220, the iterative portion of the process begins with the calculation of beam-forming vectors, for each of the K mobile stations served by the CoMP cell as well as for each of the J mobile stations served by neighboring cells. These antenna beam-forming vectors are calculated to maximize (or approximately maximize) the uplink SIINRs for each of the K+J mobile stations, given the current virtual allocation of uplink transmitter power to the mobile stations. Because the beam-forming vectors and the virtual uplink power allocations will be updated in subsequent iterations, each of these may be regarded as "tentative." Thus, block 220 depicts the determining of a tentative user-specific antenna-beam-forming vector for the antennas of the CoMP cell, for each of several first mobile stations served by the first cell as well as for each of several second mobile stations in neighboring cells, based on a most recent tentative virtual allocation of uplink transmitter power to each of the mobile stations. The beam-forming vectors are selected to maximize (or approximately maximize) signal-to-intra-and-inter-cell-interference-plus-noise ratios for each of the first and second mobile stations, i.e., signal-to-noise-plus-interference ratios that account for inter-cell interference.

As shown at block 230, the tentative user-specific beam-forming vectors are then used to find an allocation of downlink transmitter power to each of the mobile stations, given a sum-power constraint, e.g., as in Equation (10). As illustrated with Equation (10), this allocation of downlink transmitter power is found by applying a maximization objective to the smallest margin of a downlink signal-to-noise-plus-interference ratio over a corresponding target signal-to-noise-plus-interference ratio for each of the first and second mobile stations. Again, because this is an iterative process, this allocation may be considered a "current tentative" allocation of downlink transmitter power.

Once the process has converged, which may be determined by evaluating whether the smallest margin ($C(P_{max})$) increased significantly, as illustrated at block 240, then the illustrated procedure ends and the most recently calculated tentative allocation of downlink transmitter power may be used, along with the most recently determined tentative antenna beamforming vectors, to transmit data to the first mobile stations, with suppressed interference to mobile stations in other cells.

Until the process converges, however, the current tentative allocation of downlink transmitter power may be converted into a tentative virtual uplink power allocation via a variable conversion, as shown at block 250. This tentative uplink power allocation, which is simply the dual of the downlink allocation, or the uplink transmitter power allocation that achieves the same SIINRs in the uplink that the corresponding downlink power allocation achieves in the downlink, serves as the basis for the next iteration of the process, back at block 220. Thus, the current tentative virtual uplink power allocation calculated at block 250 is used at block 220 to determine a new tentative user-specific beamforming vector for each mobile station, and so on, until the process converges.

In the process illustrated in FIG. 2 and described above, transmit powers ($p_{K+1}$, $p_{K+2}$, K, $p_{K+J}$) are "allocated" to neighboring cell mobile terminals. Of course, these transmit powers are not actually used—rather, the intent of the procedure is to suppress inter-cell interference by not forming beams in the directions of these mobile terminals in neighboring CoMP cells. Thus, the transmit powers allocated to neighboring cell mobile terminals take away from the available transmit power that could be used for transmission to the mobile terminals of the first CoMP cell. In order to reduce the transmit powers for the neighboring cell mobile terminals (e.g., to zero), the above procedure could be adapted by setting the SIINR targets for those mobile stations to be very low. However, instead of reducing the transmit powers to the neighboring cell terminals, this approach results in increasing inter-cell interference by allowing beams to be formed in the directions of these mobile terminals. A different approach is to consider interference to neighboring cell mobile terminals only when determining beamforming weights for own-cell mobile terminals, so that the beams are steered away from neighboring cell mobile terminals, while ignoring neighbor-cell terminals when optimizing transmit power allocations. In other words, beamforming weights can be found by maximizing the SIINR (which includes the effects of neighboring cell mobile terminals) for all terminals, while power allocation can be found by maximizing the jointly-achievable SINR margin (which does not include the effects of neighboring cell mobile terminals). An iterative algorithm based on these two steps can be shown to converge. It maximizes the jointly-achievable downlink SINR margin under the additional constraints of avoiding beamforming in the directions of neighboring cell mobile terminals.

Thus an approach to determining downlink transmitter parameters in other embodiments of the invention iteratively repeats the steps of: (a) given an uplink power allocation, find beamforming vectors that maximize the dual uplink SIINRs; (b) given the beamforming vectors, find the downlink power allocation that maximizes the jointly-achievable SINR margin under a sum-power constraint, i.e., without regards to inter-cell interference; and (c) given the downlink power allocation, find the uplink power allocation that achieves the same SINRs in uplink, for use in the next iteration. As with the procedure illustrated in FIG. 2, the procedure is terminated when it converges to the jointly-achievable SINR margin within a desired accuracy.

Figure 3:
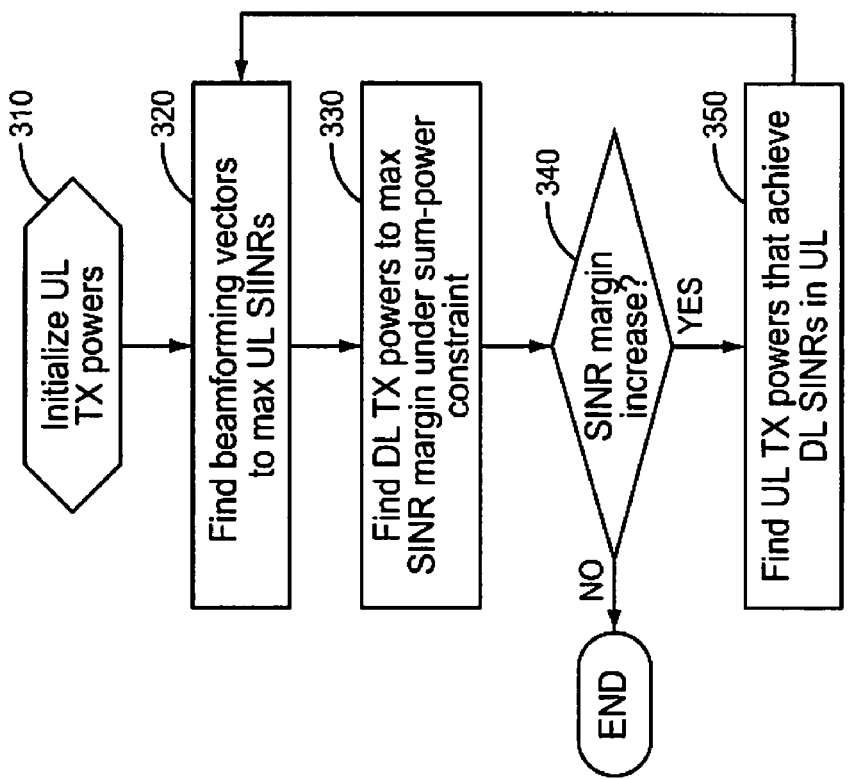
FIG. 3 illustrates another exemplary method for determining downlink transmission parameters based on a sum transmitter power constraint.

This alternative iterative process for determining downlink transmission parameters under a sum-power constraint is illustrated in the process flow diagram of FIG. 3. The process flow of FIG. 3 begins, as shown at block 310, with the initialization of a virtual allocation of uplink transmitter power to each of the K+J mobile terminals. As shown at block 320, the iterative portion of the process begins with the calculation of beamforming vectors for each of the K mobile stations served by the CoMP cell, as well as for each of the J mobile stations served by neighboring cells. These antenna beam-forming vectors are calculated to maximize (or approximately maximize) the uplink SIINRs for each of the K+J mobile stations, given the current virtual allocation of uplink transmitter power to the mobile stations. Because the beam-forming vectors and the virtual uplink power allocations will be updated in subsequent iterations, each of these may be regarded as "tentative." Thus, block 320 depicts the determining of a tentative user-specific antenna-beam-forming vector for the antennas of the CoMP cell, for each of several first mobile stations served by the first cell as well as for each of several second mobile stations in neighboring cells, based on a most recent tentative virtual allocation of uplink transmitter power to each of the mobile stations. The beam-forming vectors are selected to maximize (or approximately maximize) signal-to-intra-and-inter-cell-interference-plus-noise ratios for each of the first and second mobile stations, i.e., signal-to-noise-plus-interference ratios that account for inter-cell interference.

As shown at block 330, the tentative user-specific beam-forming vectors are then used to find an allocation of downlink transmitter power for each of the mobile stations, given a sum-power constraint. This may be done in a similar manner to that described above with respect to Equation (10). However, in this case the allocation of downlink transmitter power is found by applying a maximization objective to the smallest margin of a downlink signal-to-noise-plus-interference ratio over a corresponding target signal-to-noise-plus-interference ratio for each of the first and second mobile stations, where the signal-to-noise-plus-interference ratios and target signal-to-noise-plus-interference ratios do not account for inter-cell interference. In other words, the signal-to-interference-plus-noise ratios used in this procedure are SINRs, e.g., according to Equation (4), and the optimization of the downlink transmit power allocations is performed according to a constraint like that of Equation (5). Again, because this is an iterative process, this allocation may be considered a "current tentative" allocation of downlink transmitter power. As was the case with the procedure of FIG. 2, once the process has converged, which is determined by evaluating whether the smallest margin ($C(P_{max})$) increased significantly, as illustrated at block 340, then the illustrated procedure ends and the most recently calculated tentative allocation of downlink transmitter power may be used, along with the most recently determined tentative antenna beamforming vectors, to transmit data to the first mobile stations, with suppressed interference to mobile stations in other cells.

Until the process converges, however, the current tentative allocation of downlink transmitter power may be converted into a tentative virtual uplink power allocation via a variable conversion, as shown at block 350. This tentative uplink power allocation, which is simply the dual of the downlink allocation, or the uplink transmitter power allocation that achieves the same SIINRs in the uplink that the corresponding downlink power allocation achieves in the downlink, serves as the basis for the next iteration of the process, back at block 320. Thus, the current tentative virtual uplink power allocation calculated at block 350 is used at block 320 to determine a new tentative user-specific beamforming vector for each mobile station, and so on, until the process converges. Then, the most recently determined tentative antenna beamforming vectors may be used, along with the downlink power allocations, to transmit data to the first mobile stations, with suppressed interference to mobile stations in other cells.

The procedures illustrated in FIGS. 2 and 3, and described above, utilize a sum-power constraint, where the total downlink power for the CoMP cell is constrained. Other constraints may be used instead. For instance, some embodiments may utilize a per-transmitter power constraint (PTPC), where each of the N antennas is separately constrained. The SIINR margin under PTPC is defined as:

$$C(P_{max}) = \max_{U,\underline{p}} \min_{1 \le i \le K} \frac{SIINR_i^{DL}(U, \underline{p})}{\gamma_i}, \quad (11)$$

subject to:

$$\sum_{i \in S_n} p_i \le P_{max} \; \forall \, n = 1, 2, KN.$$

Thus, other embodiments of the present invention include a procedure in which the following steps are iteratively repeated: (a) given a virtual uplink power allocation, find the beamformers that maximize the dual uplink SIINRs, e.g., according to Equation (9); (b) given the beamforming vectors, find a downlink power allocation to maximize the jointly-achievable SIINR margin under a per-transmitter power constraint, e.g. according to Equation (11); and (c) given the downlink power allocation, find the virtual uplink power allocation that achieves the same SIINRs in the uplink, for use in the next iteration.

Figure 4:
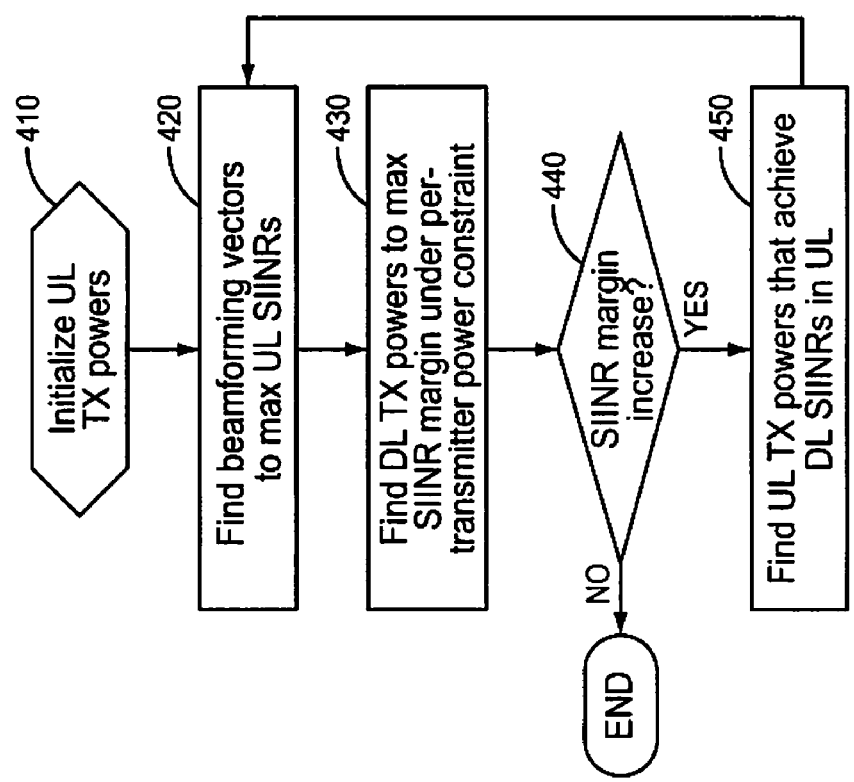
FIG. 4 illustrates an exemplary method for determining downlink transmission parameters based on a per-transmitter power constraint.

A process for determining downlink transmission parameters under a per-transmitter power constraint is thus illustrated in the process flow diagram of FIG. 4. Like the earlier illustrated processes, the process flow of FIG. 4 begins, as shown at block 410, with the initialization of a virtual allocation of uplink transmitter power to each of the K+J mobile terminals. Again like the earlier described procedures, the iterative portion of the process begins with the calculation of beamforming vectors for each of the K mobile stations served by the CoMP cell, as well as for each of the J mobile stations served by neighboring cells, as shown at block 420. Once more, these antenna beam-forming vectors are calculated to maximize (or approximately maximize) the uplink SIINRs for each of the K+J mobile stations, given the current virtual allocation of uplink transmitter power to the mobile stations. Again, because the beam-forming vectors and the virtual uplink power allocations will be updated in subsequent iterations, each of these may be regarded as "tentative." Thus, block 420 depicts the determining of a tentative user-specific antenna-beam-forming vector for the antennas of the CoMP cell, for each of several first mobile stations served by the first cell as well as for each of several second mobile stations in neighboring cells, based on a most recent tentative virtual allocation of uplink transmitter power to each of the mobile stations. The beam-forming vectors are selected to maximize (or approximately maximize) signal-to-intra-and-inter-cell-interference-plus-noise ratios for each of the first and second mobile stations, i.e., signal-to-noise-plus-interference ratios that account for inter-cell interference.

The procedure illustrated in FIG. 4 differs from the earlier described procedures beginning at block 430. As shown at block 430, the tentative user-specific beamforming vectors are then used to find an allocation of downlink transmitter power to each of the mobile stations, given a per-transmitter power constraint. This may be done according to Equation (11), for example. Thus, the allocation of downlink transmitter power is found by applying a maximization objective to the smallest margin of a downlink signal-to-noise-plus-interference ratio over a corresponding target signal-to-noise-plus-interference ratio for each of the first and second mobile stations. In this embodiment, the signal-to-noise-plus-interference ratios and target signal-to-noise-plus-interference ratios account for inter-cell interference. In other words, the signal-to-interference-plus-noise ratios used in this procedure are SIINRs, e.g., according to Equation (8). Because this is an iterative process, this downlink power allocation may be considered a "current tentative" allocation of downlink transmitter power.

Once the process has converged, which is determined by evaluating whether the smallest margin (C($P_{max}$)) increased significantly, as illustrated at block 440, then the illustrated procedure ends and the most recently calculated tentative allocation of downlink transmitter power may be used, along with the most recently determined tentative antenna beamforming vectors, to transmit data to the first mobile stations, with suppressed interference to mobile stations in other cells.

Until the process converges, the current tentative downlink power allocations may be converted into a tentative virtual uplink power allocation via a variable conversion, as shown at block 450. This tentative uplink power allocation, which those skilled in the art will recall is simply the dual of the downlink allocation, or the uplink transmitter power allocation that achieves the same SIINRs in the uplink that the downlink power allocation achieves in the downlink, serves as the basis for the next iteration of the process, back at block 420.

Like the process illustrated in FIG. 2, the procedure illustrated in FIG. 4 involves the allocation of transmit powers ($p_{K+1}$, $p_{K+2}$, K, $p_{K+J}$) to neighboring cell mobile terminals. Again, of course, these transmit powers are not actually used, as the intent of the procedure is to suppress inter-cell interference by not forming beams in the directions of mobile terminals in neighboring CoMP cells. Still another approach, analogous to that illustrated in FIG. 3, is to consider interference to neighboring cell mobile terminals only when determining beamforming weights for own-cell mobile terminals, so that the beams are steered away from neighboring cell mobile terminals, while ignoring neighbor-cell terminals when optimizing transmit power allocations. In other words, beamforming weights can be found by maximizing the SIINR (which includes the effects of neighboring cell mobile terminals) for all terminals, while power allocation can be found by maximizing the jointly-achievable SINR margin (which does not include the effects of neighboring cell mobile terminals). Thus, in another embodiment of the present invention that utilizes a per-transmitter power constraint, the following steps are iteratively repeated: (a) given a virtual uplink power allocation, find the beamforming vectors that maximize the dual uplink SIINRs; (b) given the beamforming vectors, find the downlink power allocation to maximize the jointly-achievable SINR margin under the per-transmitter power constraint, i.e., without regards to inter-cell interference; and (c) given the downlink power allocation, find the uplink power allocation that achieves the same SINRs in the uplink, for use in the next iteration. The procedure is terminated when it converges to the jointly-achievable SINR margin within a desired accuracy.

Figure 5:
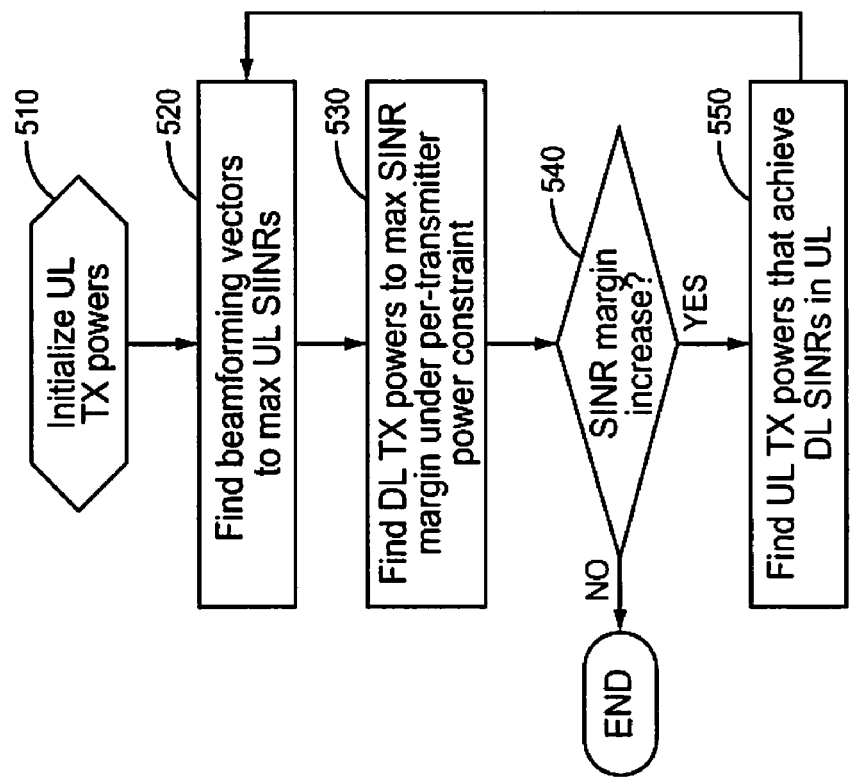
FIG. 5 illustrates another exemplary method for determining downlink transmission parameters based on per-transmitter power constraint.

This procedure is illustrated in FIG. 5, in which blocks 510, 520, 530, 540, and 550 directly correspond to blocks 410, 420, 430, 440, and 450 of FIG. 4, except that the downlink transmitter power allocations determined at block 530 are calculated without regards to inter-cell interference, i.e., using SINRs instead of SIINRs, such as illustrated by Equation (6).

Figure 6:
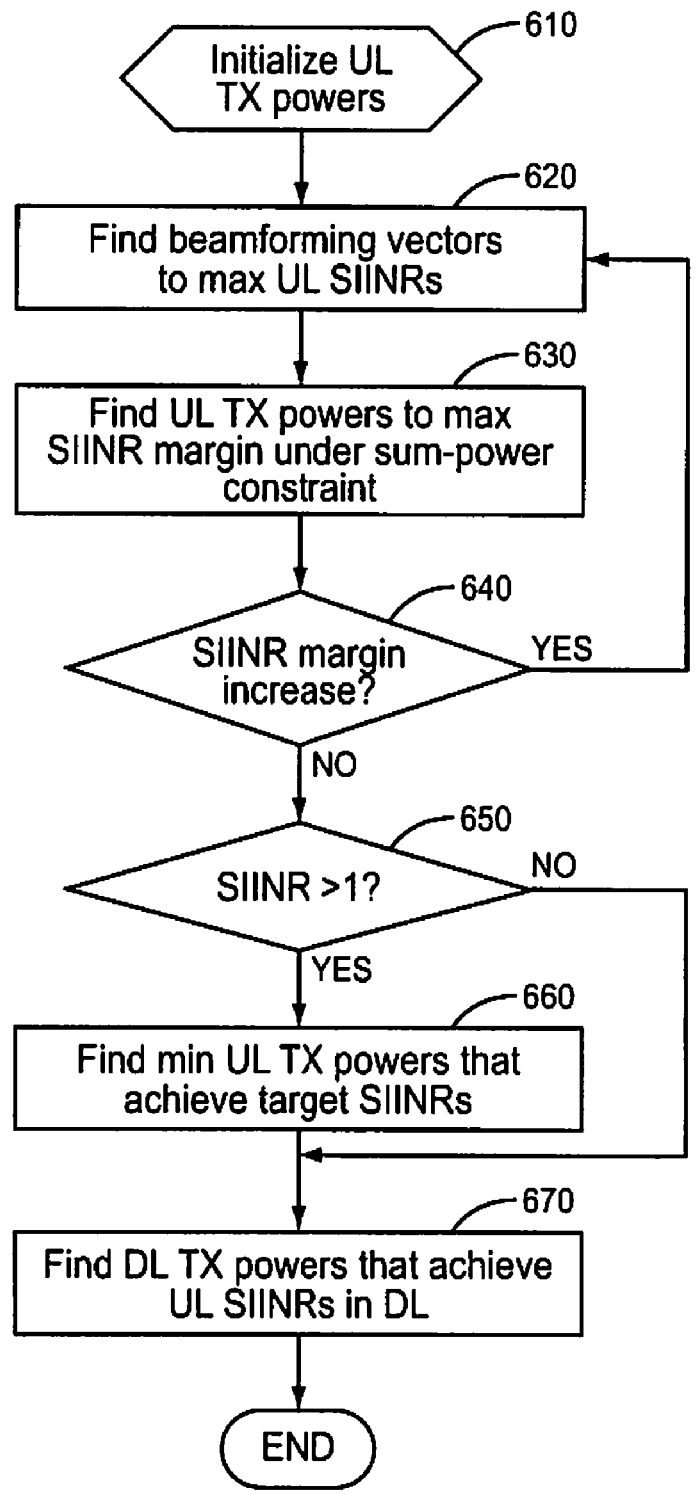
FIG. 6 illustrates an exemplary method for determining downlink transmission parameters that minimize the total power allocation while achieving target signal-to-interference-plus-noise ratios.

Still other variations of the above techniques are possible. For instance, instead of maximizing the jointly-achievable SIINR margin, some embodiments of the present invention may be configured to achieve the downlink target SIINRs for all mobile terminals with minimum total transmitter power, rather than to maximize the minimum margin of SIINR over a target SIINR. Of course, this approach is only applicable when the target SIINRs are achievable; achievability can be tested first by using one of the above procedures to determine whether the jointly-achievable SIINR margin is greater than or equal to unity. A procedure according to this approach, using a sum-power constraint, is illustrated in FIG. 6. Blocks 610, 620, 630, and 640 correspond directly to blocks 210, 220, 230, 240 of FIG. 2. However, once it is determined that the process has converged, at block 640, then the minimum margin of the uplink SIINR over the corresponding target SIINR is evaluated, as shown at block 650.

If the margin is greater than one, then the targets are achievable, and the virtual uplink transmitter power allocation can be re-allocated to achieve the minimum total transmitter power, i.e., the sum of the uplink transmitter powers allocated within the CoMP cell, given the most recently computed beamforming vectors. This is shown at block 660. This virtual uplink power allocation is then converted to the dual downlink transmit power allocation, as shown at block 670.

Those skilled in the art will appreciate that the approach illustrated in FIG. 6 is derived from the approach of FIG. 2. The techniques illustrated in FIGS. 3, 4, and 5 may be modified in a similar manner. For example, with regards to the approach illustrated in FIG. 3, instead of maximizing the jointly-achievable SINR margin, another embodiment of the present invention achieves the downlink target SINRs for all mobile terminals with minimum sum transmit power, given that the target SINRs are achievable. As before, achievability can be tested first by using the process illustrated in FIG. 3 to determine if the jointly-achievable SINR margin is greater than or equal to unity.

In yet another variant applicable to all of the preceding embodiments of the present invention, the transmit covariance matrices of the neighboring cell mobile terminals ($R_i$, i=K+1, K+2, K K+J) can be multiplied by a scalar $\alpha \leq 1$ in order to control the extent of inter-cell interference suppression. It has been found that $\alpha$ should be set equal to 1 for light to moderate traffic loads, while it should be less than 1 for high traffic loads. This is because in light traffic some of the degrees of freedom in beamforming can be used to suppress inter-cell interference. In heavy traffic, inter-cell interference suppression may cause large signal reduction and thus cause more harm than good.

In all embodiments of the present invention, scheduling information can be shared between neighboring cells, e.g., by means of the 3GPP-defined X2 interface, or derived from traffic monitoring. The transmit covariance matrices for the neighboring cell mobile terminals can be obtained from their uplink pilot channels. The noise variances for the neighboring cell mobile terminals can be replaced by estimates obtained from the own-cell mobile terminals.

Figure 7:
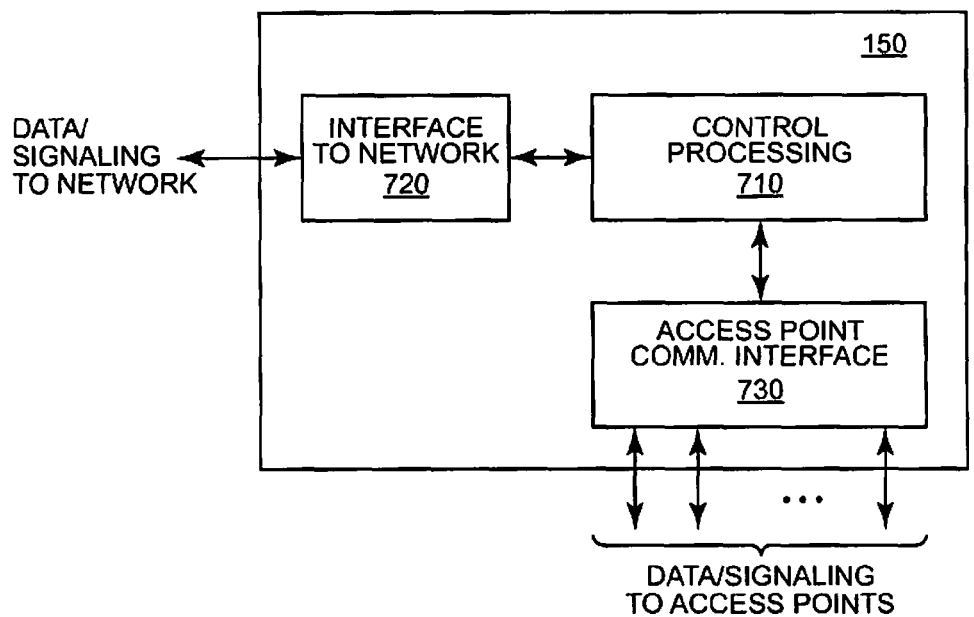
FIG. 7 illustrates an embodiment of a coordinated multi-point cell controller.

Those skilled in the art will appreciate that the techniques described above may be implemented at a control function located in or associated with a CoMP cell, such as the CoMP controller 150 generally illustrated in FIG. 1. This CoMP controller may be part of a base station node, e.g., directly associated with one of the transmitting elements, or elsewhere. An exemplary embodiment of a CoMP controller 150 is illustrated in FIG. 7, which depicts some of the functional elements of an appropriate controller; other elements not necessary to a complete understanding of the present invention are omitted. CoMP controller 150 includes a network interface unit 720, which processes user data coming from and going to the data network as well as signaling from the network and other cells. CoMP controller 150 further includes an access point communication interface, which connects the controller 150 to the access points (transmitters) for the sending and receiving of user data and control signaling. This control signaling includes control data for setting the access point transmit powers according to the downlink power allocations, as well as for establishing the beamforming according to the beamforming vectors calculated according to the techniques described above.

Figure 8:
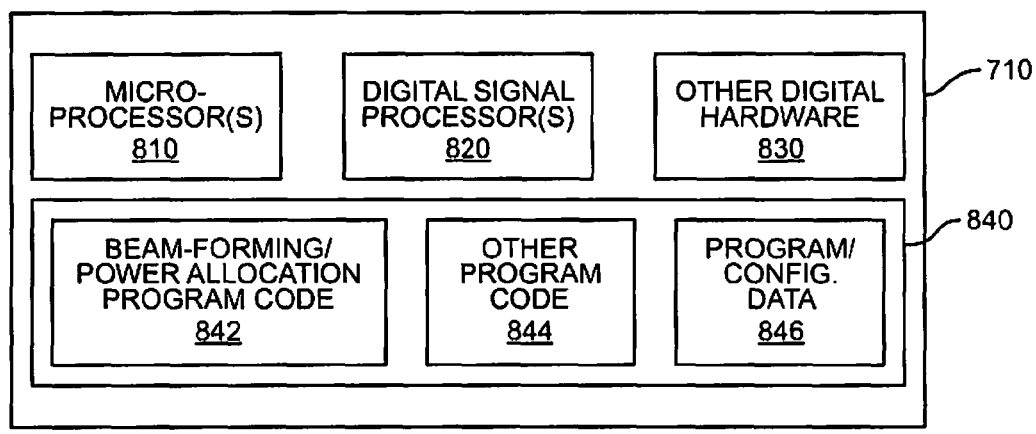
FIG. 8 illustrates an embodiment of CoMP control processing circuits according to some embodiments of the present invention.

Finally, CoMP controller 150 includes a control processing unit 710, which is configured to carry out one or more of the techniques described herein for determining downlink transmission parameters in a CoMP cell. Details of an exemplary control processing unit 710 are illustrated in FIG. 8, where control processing unit 710 includes one or more microprocessors 810, one or more digital signal processors 820, and other digital hardware 830, any or all of which may be configured with software and/or firmware stored in memory 840. In particular, this software includes beam-forming and power allocation program code 842, which comprises instructions for carrying out one or more of the techniques described above. This software also includes other program code 844, which may include program instructions for generally operating the CoMP controller, controlling network interface 720 and access point interface 730, and the like. Finally, memory 840 includes program data and configuration data, such as in a random-access memory (RAM) or flash memory.

More generally, those skilled in the art will appreciate that control processor 710 may comprise any of a variety of physical configurations, such as in the form of one or more application-specific integrated circuits (ASICs). In many of these embodiments, control processor 710 may comprise one or more microprocessors, microcontrollers, and/or digital signal processors programmed with appropriate software and/or firmware to carry out one or more of the processes described above, or variants thereof. In some embodiments, these processing circuits may comprise customized hardware to carry out one or more of the functions described above. Other embodiments of the invention may include computer-readable devices, such as a programmable flash memory, an optical or magnetic data storage device, or the like, encoded with computer program instructions which, when executed by an appropriate processing device, cause the processing device to carry out one or more of the techniques described herein for equalizing received signals in a communications receiver.

Those skilled in the art will recognize, of course, that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method for determining downlink transmission parameters in a first cell of a cellular wireless network using coordinated multi-point transmission, wherein the first cell comprises a plurality of radio access points and wherein each radio access point comprises one or more transmit antennas, the method comprising, for each of two or more iterations:
   determining, for each of a plurality of first mobile stations served by the first cell and for each of one or more second mobile stations served by one or more neighboring cells, a tentative user-specific antenna beam-forming vector for the antennas of the first cell, using a most recent tentative virtual allocation of uplink transmitter power to each of the first and second mobile stations and based on virtual uplink signal-to-noise-plus-interference ratios for the first and second mobile stations that account for inter-cell interference, wherein determining said tentative user-specific antenna beam-forming vector comprises of a non-physical modeling element used for determination of uplink transmitter power as the most recent tentative virtual allocation of uplink transmitter power;
   determining a current tentative allocation of downlink transmitter power to each of the first mobile stations based on the tentative user-specific antenna beam-forming vectors, a pre-determined transmitter power constraint for the first cell, and target signal-to-noise-plus-interference ratios for the first mobile stations; and
   determining a current tentative virtual allocation of uplink transmitter power to each of the first and second mobile stations, based on the current tentative allocation of downlink transmitter power.

2. The method of claim 1, wherein the pre-determined transmitter power constraint defines a maximum downlink transmitter power aggregated over the plurality of radio access points.

3. The method of claim 1, wherein the pre-determined transmitter power constraint defines a maximum access point transmitter power for each of the plurality of radio access points.

4. The method of claim 1, wherein determining the current tentative allocation of downlink transmitter power to each of the first mobile stations comprises finding downlink transmitter powers corresponding to each of the first mobile stations by applying a maximization objective to the smallest margin between a downlink signal-to-noise-plus-interference ratio that accounts for inter-cell interference and a corresponding target signal-to-noise-plus-interference ratio for each of the first mobile stations, given the tentative user-specific antenna beam-forming vectors.

5. The method of claim 1, wherein determining the current tentative allocation of downlink transmitter power to each of the first mobile stations comprises finding downlink transmitter powers corresponding to each of the first mobile stations by applying a maximization objective to the smallest margin between a downlink signal-to-noise-plus-interference ratio and a corresponding target signal-to-noise-plus-interference ratio, given the tentative user-specific antenna beam-forming vectors, for each of the first mobile stations, without regard to interference to or from the second mobile stations.

6. The method of claim 1, wherein determining the current tentative allocation of downlink transmitter power to each of the first and second mobile stations comprises finding downlink transmitter powers corresponding to each of the first mobile stations by determining downlink transmitter powers that achieve target signal-to-noise-plus-interference ratios for the first mobile stations while approximately minimizing the sum of the downlink transmitter powers.

7. The method of claim 1, wherein determining the tentative user-specific antenna beam-forming vector for each of the mobile stations comprises, for each of the two or more iterations, finding an antenna beam-forming vector for each of the mobile stations that approximately maximizes the virtual uplink signal-to-noise-plus-interference ratio for the respective mobile station, given the most recent tentative virtual allocation of uplink transmitter power for the mobile stations.

8. The method of claim 7, further comprising, after completion of the two or more iterations, determining a final user-specific antenna beam-forming vector for each of the mobile stations by setting the final user-specific antenna beam-forming vector for each of the mobile stations to equal the most recent corresponding tentative antenna beam-forming vector.

9. The method of claim 8, further comprising, after completion of the two or more iterations, determining final downlink transmitter power allocations for the first mobile stations based on the most recent tentative allocation of downlink transmitter power to each of the first mobile stations.

10. A controller for a first cell of a cellular wireless network using coordinated multi-point transmission, wherein the first cell comprises a plurality of radio access points and wherein each radio access point comprises one or more transmit antennas, the controller comprising an interface circuit communicatively connecting the controller to the plurality of radio access points and one or more processing circuits configured to, for each of two or more iterations:
   determine, for each of a plurality of first mobile stations served by the first cell and for each of one or more second mobile stations served by one or more neighboring cells, a tentative user-specific antenna beam-forming vector for the antennas of the first cell, based on a most recent tentative virtual allocation of uplink transmitter power to each of the first and second mobile stations and virtual uplink signal-to-noise-plus-interference ratios for the first and second mobile stations that account for inter-cell interference, wherein determining said tentative user-specific antenna beam-forming vector comprises of a non-physical modeling element used for determination of uplink transmitter power as the most recent tentative virtual allocation of uplink transmitter power;
   determine a current tentative allocation of downlink transmitter power to each of the first mobile stations based on the tentative user-specific antenna beam-forming vectors, a pre-determined transmitter power constraint for the first cell, and target signal-to-noise-plus-interference ratios for the first mobile stations; and
   determine a current tentative virtual allocation of uplink transmitter power to each of the first and second mobile stations, based on the current tentative allocation of downlink transmitter power.

11. The controller of claim 10, wherein the pre-determined transmitter power constraint defines a maximum downlink transmitter power aggregated over the plurality of radio access points.

12. The controller of claim 10, wherein the pre-determined transmitter power constraint defines a maximum access point transmitter power for each of the plurality of radio access points.

13. The controller of claim 10, wherein the one or more processing circuits are configured to determine the current tentative allocation of downlink transmitter power to each of the first mobile stations by finding downlink transmitter powers corresponding to each of the first and second mobile stations by applying a maximization objective to the smallest margin between a downlink signal-to-noise-plus -interference ratio that accounts for inter-cell interference and a corresponding target signal-to-noise-plus-interference ratio for each of the first mobile stations, given the tentative user-specific antenna beam-forming vectors.

14. The controller of claim 10, wherein the one or more processing circuits are configured to determine the current tentative allocation of downlink transmitter power to each of the first mobile stations by finding uplink transmitter powers corresponding to each of the first mobile stations by applying a maximization objective to the smallest margin between a downlink signal-to-noise-plus-interference ratio and a corresponding target signal-to-noise-plus-interference ratio, given the tentative user-specific antenna beam-forming vectors, for each of the first and second mobile stations, without regard to interference to or from the second mobile stations.

15. The controller of claim 10, wherein the one or more processing circuits are configured to determine the current tentative allocation of downlink transmitter power to each of the first mobile stations by finding downlink transmitter powers corresponding to each of the first mobile stations by determining downlink transmitter powers that achieve target signal-to-noise-plus-interference ratios for the first mobile stations while approximately minimizing the sum of the downlink transmitter powers.

16. The controller of claim 10, wherein the one or more processing circuits are configured to determine the tentative user-specific antenna beam-forming vector for each of the mobile stations by, for each of the two or more iterations, finding an antenna beam-forming vector for each of the mobile stations that approximately maximizes the virtual uplink signal-to-noise-plus-interference ratio for the respective mobile station, given the most recent tentative virtual allocation of uplink transmitter power for the mobile stations.

17. The controller of claim 10, wherein the one or more processing circuits are further configured to, after completing the two or more iterations, determine a final user-specific antenna beam-forming vector for each of the mobile stations by setting the final user-specific antenna beam-forming vector for each of the mobile stations to equal the most recent corresponding tentative antenna beam-forming vector.

18. The controller of claim 17, wherein the one or more processing circuits are further configured to, after completing the two or more iterations, determine final downlink transmitter power allocations for the first mobile stations based on the most recent tentative virtual allocation of downlink transmitter power to each of the first mobile stations.

* * * * *